United States Patent [19]
Korrell et al.

[11] 3,924,833

[45] Dec. 9, 1975

[54] CAM CONTROLLED VARIABLE SPEED DRIVE FOR CLOTHES DRYER

[75] Inventors: Melvin H. Korrell, Benton Harbor; Sandy C. Gay, St. Joseph, both of Mich.

[73] Assignee: Nibco Inc., Elkhart, Ind.

[22] Filed: Sept. 11, 1974

[21] Appl. No.: 504,981

[52] U.S. Cl. ............................................... 74/242.4
[51] Int. Cl.² .......................................... F16H 7/08
[58] Field of Search .................................. 74/242.4

[56] References Cited
UNITED STATES PATENTS
2,504,529   4/1950   Isom .................................. 74/242.4
3,715,770   2/1973   Obregon-Gomez ............ 74/242.4 X

*Primary Examiner*—Leonard H. Gerin
*Attorney, Agent, or Firm*—Price, Heneveld, Huizenga & Cooper

[57] ABSTRACT

A cam controlled variable speed drive for dryers employs a belt shifter which includes a pivotally mounted shifter shaft carrying a shifter roller which is positioned in engagement with and with respect to a drive belt in a first position, a neutral position and a second position in accordance with a program stored on a rotatable cam which receives the end of the shifter shaft in a groove in a face of the cam. The stored program effects movement of the shifter shaft and roller from the first position to the second position via the intermediate position, and vice-versa, to shift the belt between different diameter positions of a pulley mounted on the drive motor of the appliance. In a clothes dryer, wherein the belt encircles the rotating drum, shifting of the belt effects different speeds of rotation of the drum and improves drying efficiency.

12 Claims, 6 Drawing Figures

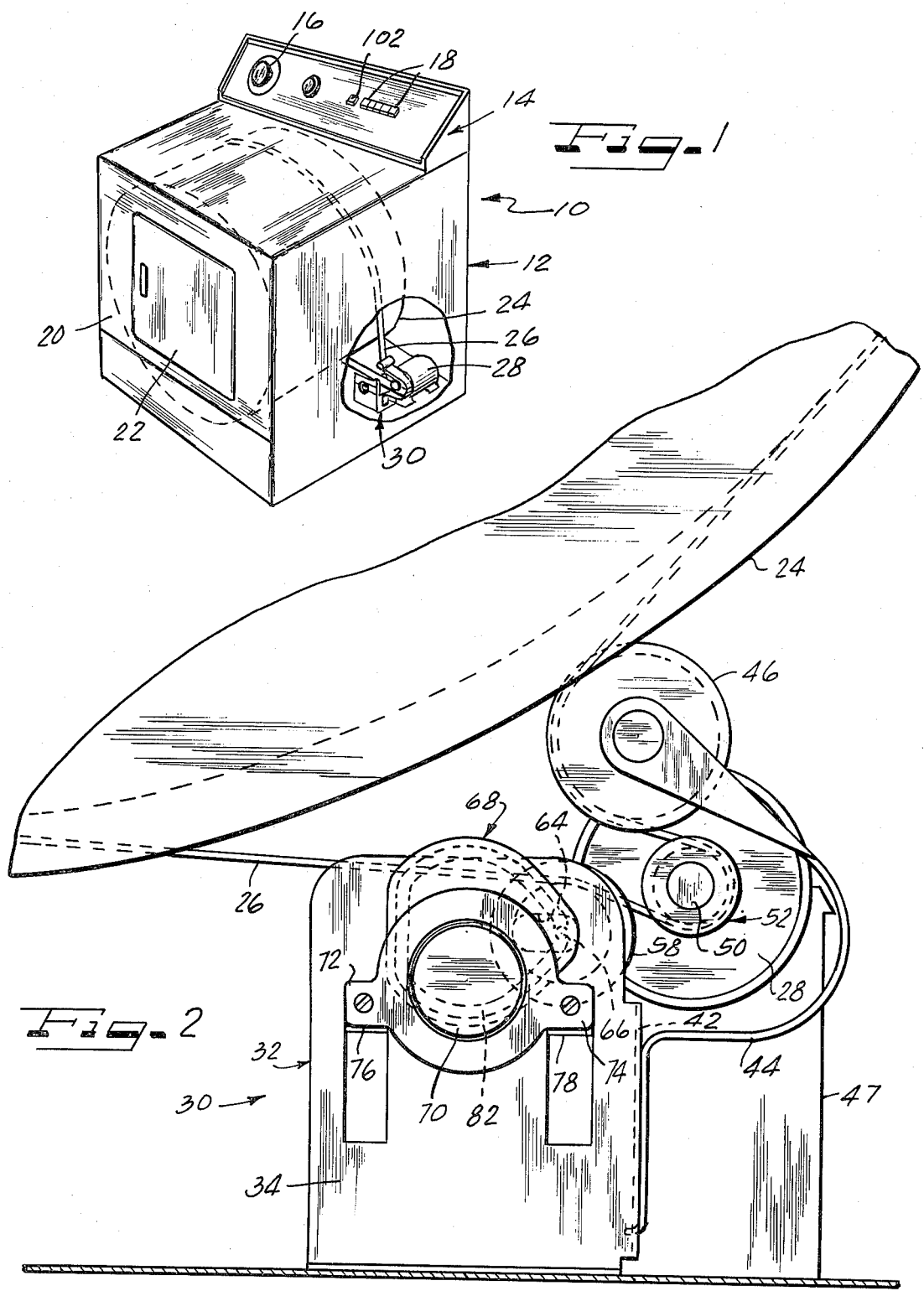

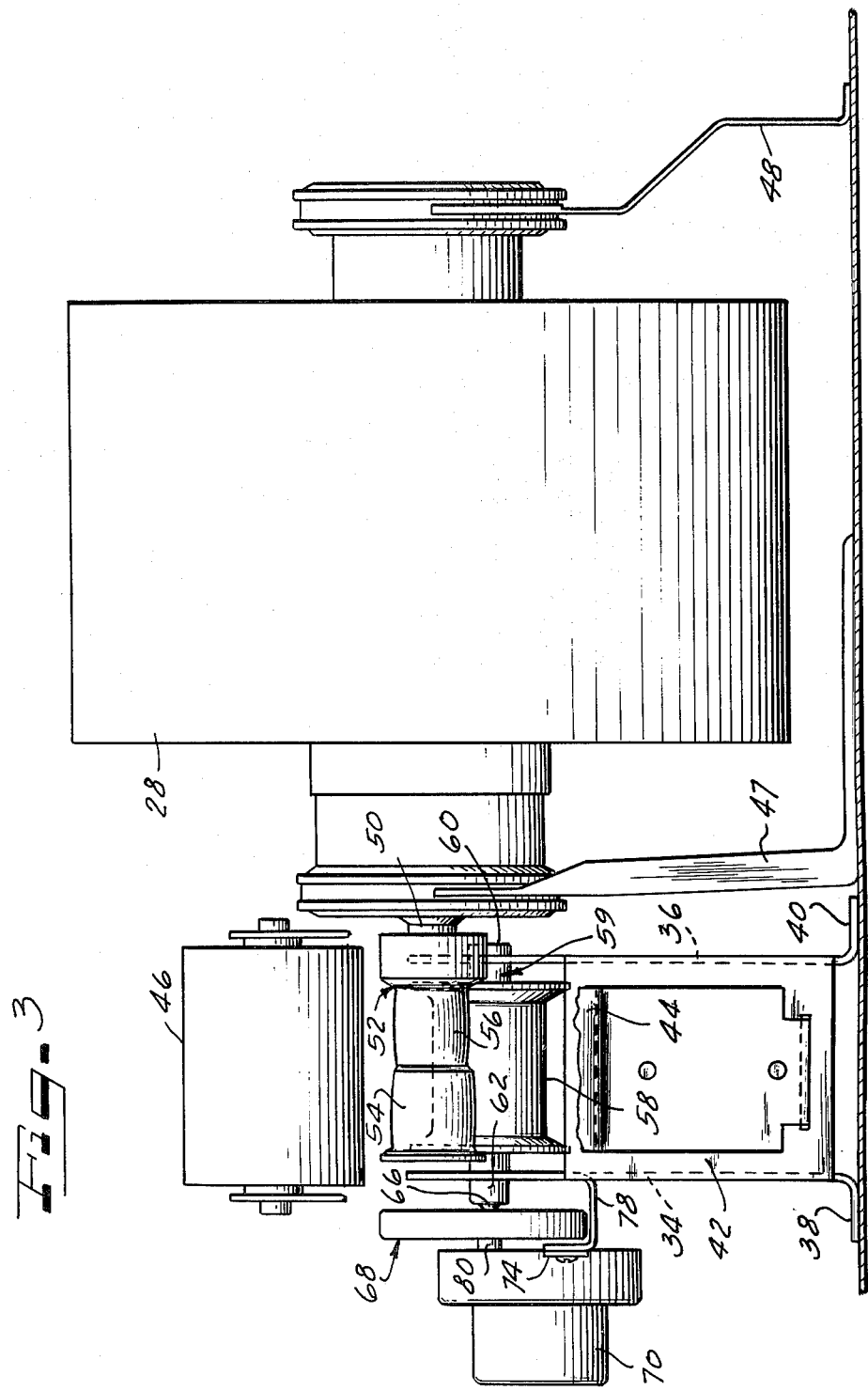

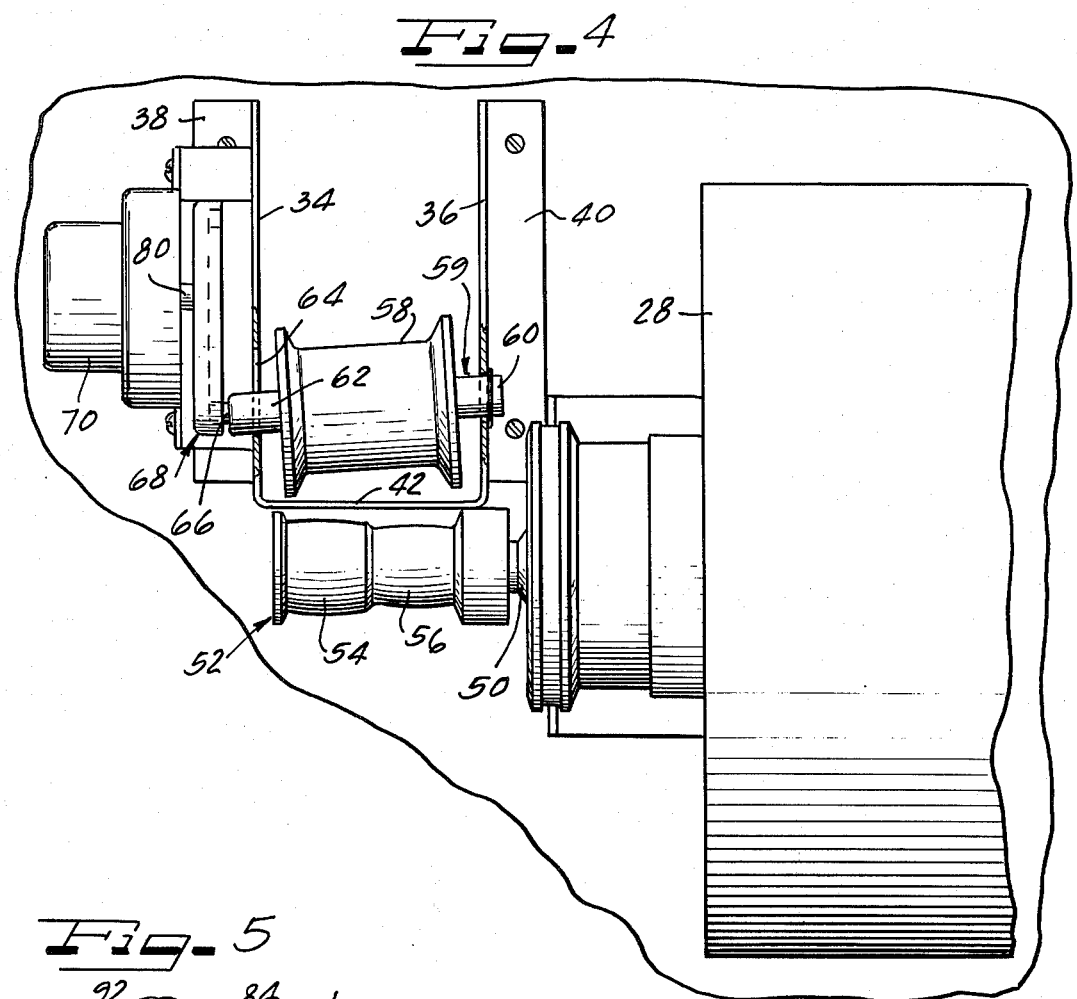
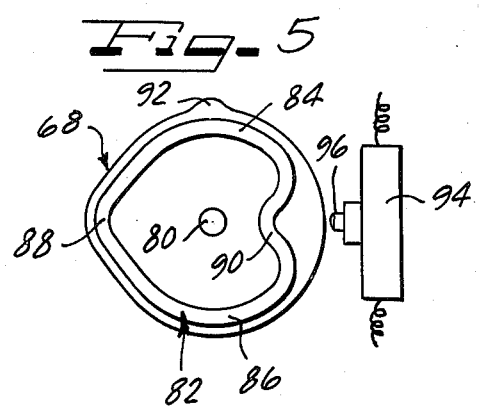
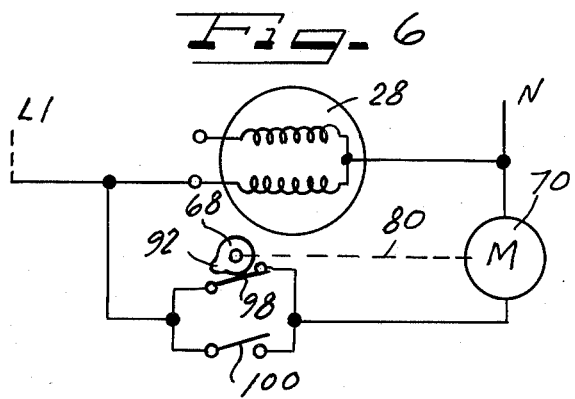

CAM CONTROLLED VARIABLE SPEED DRIVE FOR CLOTHES DRYER

BACKGROUND OF THE INVENTION

1. Field of the Invention

This invention relates to a belt shifter, and is more particularly concerned with a belt shifter which includes apparatus for providing a periodic belt shifting operation to periodically vary the speed of a driven element, for example a rotating drum of a clothes dryer.

2. Description of the Prior Art

In U.S. Pat. No. 3,731,550, issued May 8, 1973, and assigned to Whirlpool Corporation, Ronald J. Malecki and Kenneth J. Grall disclose a belt shifting device for a clothes dryer in which a pivotally mounted shifter shaft, carrying a shifter roller, is pivoted between first and second positions by a solenoid to urge the drive belt of a clothes dryer to respective positions along a conical output pulley of a drive motor.

Alvin E. Burkall, in his U.S. Pat. No. 3,707,882, also assigned to Whirlpool Corporation, discloses the use of a pair of curved fingers to force a drive belt axially along the drive surface of a pulley which has a tapering drive surface with circular grooves therein, force applied to the belt causing the belt to twist and raise the opposite edge thereof away from the surface of the drive pulley to lift grooves in the inner surface of the belt out of engagement with the grooves on the drive surface of the pulley during shifting.

U.S. Pat. No. 3,303,711 discloses a belt shifter in a tape recorder in which a cam having both face and edge cam surfaces is utilized for changing speed and performing control functions.

Other prior art which may be of interest includes U.S. Pat. Nos. 2,346,437; 3,270,431; 3,365,810; and 3,570,318.

SUMMARY OF THE INVENTION

A primary object of the invention is to improve drying efficiency in a clothes dryer by varying the speed of rotation of the dryer drum in a manner so as to improve the tumbling pattern of the clothes being dried.

Another object of the invention is to reduce tangling of clothes in a dryer drum by subjecting the clothes to an improved tumbling pattern.

Another object of the invention is to provide an improved belt shifter which is operable to vary the speed of a driven element in accordance with a predetermined program.

According to the invention, the drive pulley of the drive motor output shaft is provided with two distinct portions of different diameter, the drive belt being capable of riding on either portion. In the particular embodiment disclosed herein, the drive belt drives the rotatable drum of a clothes dryer. The belt shifter includes a shifting roller upon which the belt also rides, the shifting roller being rotatably mounted on a shifter shaft which is pivotally mounted at one end so that it may assume, for two speeds of rotation, a first, a second and a neutral position. In the neutral position, the shifting roller is substantially perpendicular to the plane formed by the belt, and in the first and second positions it is inclined at respectively opposite angles with regard to that plane. When the shifting roller is in the first position, the belt is urged to ride on one portion of the motor pulley; and when the shifting roller is in its second position, the belt is urged to ride on the other portion of the motor pulley. When the shifter pulley is in its neutral position, the belt does not change its position on the motor pulley. Movement of the belt from the first to the second or from the second to the first position on the motor pulley will alter the rotational speed of the dryer drum.

The shifter shaft is pivotally mounted at one end, and its other end extends through an elongate slot in a mounting bracket to accommodate the shifting movements. The end of the shaft which extends through the slot is provided with a cam follower which rides in a cam slot formed in the face of a motor driven cam. The cam slot is of a configuration to move the shifter roller from its first position, to its neutral position, to its second position, to its neutral position, to its first position, etc., continuously for as long as the motor driving the cam operates. The cam therefore stores a program of periodic belt shifting operations and, thus, a program of speed variations for the rotating drum.

Advantageously, the cam may also be provided with a peripheral lobe and a single throw switch operated by the lobe, in conjunction with a manually operated switch, for selecting the variable speed feature of the machine as desired.

BRIEF DESCRIPTION OF THE DRAWINGS

Other objects, features and advantages of the invention, together with its organization, construction and operation will be best understood from the following detailed description of a preferred embodiment of the invention, taken in conjunction with the accompanying drawings, in which:

FIG. 1 is a perspective view of an automatic clothes dryer, shown partially broken away, including apparatus constructed in accordance with the present invention;

FIG. 2 is a detailed end view of a belt shifter constructed in accordance with the invention as it would be mounted in the dryer of FIG. 1;

FIG. 3 is a side elevation of the apparatus illustrated in FIG. 2, shown with a portion of the idler bracket removed;

FIG. 4 is a top view of the belt shifter apparatus illustrated in FIGS. 2 and 3, shown with the idler mechanism removed and illustrated partially in section to show the pivotal mounting of the shifter shaft and shifter roller;

FIG. 5 is a diagrammatic illustration of apparatus for switching off the belt shifting feature of the machine; and FIG. 6 is a simplified schematic diagram showing the connection of the apparatus of FIG. 5 in a dryer control circuit along with a switch for selecting multi-speed operation.

DESCRIPTION OF THE PREFERRED EMBODIMENT

Referring to FIG. 1, an embodiment of the invention is generally illustrated in an automatic clothes dryer 10 which comprises a cabinet 12 carrying a console 14 which has a plurality of control mechanisms including a rotary timing device 16 and push buttons 18.

The cabinet 12 includes a front wall 20 having a closure door 22 for covering an opening which provides access to the interior of a rotatable drum 24. The drum 24 has a drive belt 26 thereabout which is connected in driving engagement with a drive motor 28, as will be detailed below.

The drive belt 26 is also in engagement with a belt shifting apparatus 30 which is constructed in accordance with the invention and which will also be set forth in detail below.

Referring to FIGS. 2, 3, and 4, the rotatable drum 24 is rotated at different speeds to improve the tumbling pattern of clothes within the drum. The speed of rotation is varied in accordance with a predetermined, stored, and selectively effective speed-changing program, by a belt-shifting apparatus 30.

The belt-shifting apparatus 30 includes a mounting bracket 32 having a pair of upstanding sidewalls 34 and 36 which terminate at their lower ends in respective outturned mounting flanges 38 and 40 which are used, with suitable fastening means, to secure the mounting bracket 32 to the bottom wall of the dryer cabinet 12.

The upstanding bracket walls 34 and 36 are interconnected by an upstanding wall 42 which provides the walls 34 and 36 with a parallel disposition and rigidity. As illustrated in the drawings, the walls 34, 36 and 42 may be formed from a single piece of sheet metal.

The mounting bracket 32 may be utilized to support an idler bracket 44 which carries an idler roller 46 in engagement with the drive belt 26, as is well known in the art. The idler bracket 44 may be secured to the wall 42 by suitable fastening means, such as machine screws or the like.

The drive motor 28 is mounted immediately adjacent the mounting bracket 32 on a pair of motor mounts 47 and 48 and includes a rotatable output shaft 50 which carries a pulley 52 having portions 54 and 56 (including respective drive surfaces) of different diameters. It is readily apparent that the drum 24 will rotate at one speed when the drive belt 26 runs on the pulley portion 54 and at another speed when the drive belt 26 runs on the pulley portion 56.

In order to change the position of the drive belt 26 on the drive pulley 52, the belt shifting apparatus is provided with a roller 58 which is rotatably carried on a shifter shaft 59 which has one end 60 pivotally mounted in the upstanding wall 36 and the other end 62 disposed in an elongate slot 64 formed in the upstanding wall 34. The roller 58 is rotatably mounted on the shaft 59 by suitable bearings (not shown).

To impart a pivotal movement of the shaft 59, the shaft is provided with a portion 66 of reduced diameter which extends axially from the end 62 and functions as a cam follower. The cam follower 66 engages a cam track in a face of a disc or cam 68 which is rotatably carried on an output shaft 80 of a shifting motor or cam motor 70. The cam motor 70 includes a housing having a pair of mounting ears 72 and 74 which are secured by suitable fastening means, such as machine screws, to a pair of L-shaped members 76 and 78 which are lanced out from the upstanding wall 34.

As seen in FIGS. 2 and 5, as the motor 70 rotates the cam 68, the cam follower 66 is moved in a horizontal line as it follows a cam track 82, in the form of a groove in a face of the cam 68. The camming groove 82 is generally circular and includes a pair of circularly arcuate portions 84 and 86 intermediate a pair of oppositely directed lobe portions 88 and 90, the radius of portion 88 being substantially greater than the radius of portion 90, as shown in FIG. 5. As the cam 68 rotates, the cam follower 66 is moved in a direction, as illustrated in FIGS. 2 and 4, by the groove portion 88 to pivot the shaft 59 to an angle wherein the belt 26 is biased toward the drive pulley portion 56 so that the drum 24 is rotated at a slower speed. As the cam rotates further and brings the cam follower 66 into a neutral position, corresponding to the cam track portions 84 and 86, the belt remains on the drive pulley portion 56 until the oppositely directed portion 90 of the cam track is approached, whereupon the shaft 59 is shifted in the opposite or second direction to bias the belt toward the drive pulley portion 54. When running on the drive pulley portion 54, the belt 26 rotates the drum at a slower speed.

In the embodiment described herein, the three positions of the shifter shaft 59 and shifter roller 58 cause the dryer to alternate between two speeds of rotation for the drum 24. However, a different cam track configuration and a different number of different diameters of the drive pulley 52 may be utilized to effect a different program of speed changes and different speeds of rotation of the driven component, here a clothes dryer drum.

In a clothes dryer, it is often advantageous to have a facility for selecting rotation of the drum at one speed, or multi-speed rotation, depending on the type of load being dried. For this purpose, the cam 68 may be utilized in conjunction with a selector switch to cause rotation of the drum in either mode of operation. Referring to FIGS. 5 and 6, the cam 68 may be provided with a cam lobe 92 on the periphery thereof for operating an actuator 96 of a switch 94. The switch 94 may be mounted on the upstanding wall 34 of the mounting bracket 32 and include contacts 98 which are connected in series with the cam motor 70 between a pair of electrical leads L1 and N of the dryer control circuit. As shown in FIG. 6, as the cam 68 is rotated to a position wherein the shaft 59 is in its neutral position, the cam lobe 92 opens the switch contacts 98. A manually operated switch 100 is provided in parallel with the contacts 98 so that when an operator selects a single speed operation by opening the switch 100, the dryer drum will rotate at the last speed effected by the cam 68 the next time that the lobe 92 actuates the switch 94. The speed selection function can be accomplished by the switch contacts 100 through the operation of a push button switch or the like 102 on the console 14 (FIG. 1). Also, the switch contacts 100 may be timer-control contacts which are effective in a predetermined portion of a selected drying program, using cam-stack operated contacts as is well known in the art. Also, the cam lobe 92 may be provided on the opposite side of the cam from that illustrated in the drawing, or provided on both sides of the cam, so that the operator may select the single speed of rotation in that after selection the next opening of the contacts 98 causes the drum to be rotated at the last selected speed.

Although we have described our invention by reference to a particular illustrative embodiment thereof, many changes and modifications of the invention may become apparent to those skilled in the art without departing from the spirit and scope of the invention. We therefore intend to include within the patent warranted hereon all such changes and modifications as may reasonably and properly be included within the scope of our contribution to the art.

The embodiments of the invention in which an exclusive property or privilege is claimed are defined as follows:

1. In a laundry appliance, a belt shifting device for moving a belt axially on a drive pulley having at least two drive surfaces of different diameters, said device comprising:
- a shifter roller;
- mounting means for supporting said roller for movement with respect to the belt and in frictional engagement with the belt adjacent to the drive pulley; and
- cam means for continuously causing periodic movement of the roller between a first position and a neutral position and between a second position and the neutral position on said mounting means,
  said roller in the first position urging the belt from one to another of the drive surfaces of the motor pulley in one direction axially along the pulley, and said roller in the second position urging the belt from one to another of the drive surfaces of the motor pulley in the opposite direction axially along the pulley.

2. In a laundry appliance as claimed in claim 1, wherein said mounting means includes a pivotally mounted shifter shaft carrying said roller, and said cam means comprises a shifting motor mounted on said mounting means, said shifting motor having a rotatable output shaft, a disc mounted on said output shaft and having a continuous cam surface in a face thereof to cooperate with an end of said shifter shaft, said cam surface being shaped to define said first, second, and neutral positions.

3. In a laundry appliance as claimed in claim 1, wherein said mounting means includes a pivotally mounted shifter shaft rotatably mounting said shifter roller and a cam follower carried on said shifter shaft, and said cam means includes an endless cam track which receives said cam follower and moves said cam follower, said shifter shaft, and said roller to said first, neutral and second positions.

4. In a laundry appliance as claimed in claim 3, wherein said cam means comprises a rotatable cam disc having said cam track in one face thereof, said cam track comprising a generally circular groove having a pair of circular portions intermediate a pair of oppositely directed lobe portions, said oppositely directed lobe portions respectively corresponding to said first and second roller positions and said circular portions corresponding to said neutral roller position.

5. In an automatic clothes dryer having a rotatable drum for tumbling clothes, a drive motor with an output shaft, and a drive belt for driving the drum from the motor; control means for varying the rotational speed of the drum, said control means comprising:
- a motor pulley having two distinct drive portions of differing diameter, said motor pulley being fixedly attached to the output shaft of the drive motor for rotation therewith and in driving engagement with the drive belt;
- shifter means including a shifter bracket having vertically disposed spaced and substantially parallel first and second side members, a shifter shaft having a first end, a first end portion slidably mounted on the first side member, and a second end portion pivotally mounted on the second side member, and a shifter roller rotatably mounted on the shifter shaft and in engagement with the drive belt;
- a rotatable face cam having a continuous cam groove, said face cam mounted on the shifter bracket adjacent the first side member for rotation with respect to said shifter bracket; and
- motor means powered from a power source for rotating the face cam,
  said first end of the shifter shaft riding in the cam groove to cause the first end portion to slide with respect to the first side member,
- whereby the shifter means in conjunction with the face cam and the motor means causes the drive belt to move between the two positions of the motor pulley, thereby varying the rotational speed of the drum to improve the tumbling pattern of the clothes.

6. The automatic clothes dryer as claimed in claim 5, wherein the face cam has a lobe portion on its circumference and wherein switch means are provided to function in response to the position of said lobe to selectively terminate the rotation of said face cam to thereby selectively control the operation of the control means.

7. The automatic clothes dryer as claimed in claim 6, wherein the switch means includes a first switch responsive to the position of the lobe and a second switch for manual operation, said first and second switches being in parallel relationship with each other and interposed in series relationship between the motor means and the power source for said motor means.

8. In an automatic clothes dryer having a rotatable drum for tumbling clothes, a drive motor with an output shaft, and a drive belt for driving the drum from the motor, control means for varying the rotational speed of the drum, said control means comprising:
- a motor pulley having two distinct drive portions of differing diameter, said motor pulley being fixedly attached to the output shaft of the drive motor for rotation therewith and in driving engagement with the drive belt;
- shifter means including a shifter shaft having a slidably mounted first end portion and a pivotally mounted second end portion, and a shifter roller rotatably mounted on the shifter shaft in engagement with the belt; and
- means for periodically shifting the rotational speed of the drum, including means coupled to the slidably mounted first end portion of said shaft storing a periodic program of belt shifting operations, and
- means for operating said storing means through the stored program to periodically change the angular disposition of the shifter shaft.

9. In an automatic clothes dryer as claimed in claim 8, wherein said means storing a program comprises a rotatable disc including a face having a camming groove therein which receives said first end portion of said shifter shaft.

10. In an automatic clothes dryer as claimed in claim 9, wherein said camming groove defines a generally circular path having at least one portion which departs from the circular path.

11. In an automatic clothes dryer as claimed in claim 9, wherein said means for operating said program storing means includes a shifter motor for connection to an electrical supply for rotating said disc, and comprising switch means interposed between said shifter motor and the electrical supply for selectively operating said shifter motor.

12. In an automatic clothes dryer as claimed in claim 11, wherein said disc includes a cam lobe on the periphery thereof, and said switch means includes a manually operated first switch and a second switch operated by said cam lobe, said first and second switches being connected in parallel relationship so that with said first switch open said shifter motor is deenergeized in response to opening of said second switch by said cam lobe, whereby the drum continues to rotate at the speed defined by the portion of the camming groove which is radially aligned with said cam lobe.

* * * * *

UNITED STATES PATENT AND TRADEMARK OFFICE
CERTIFICATE OF CORRECTION

PATENT NO. : 3,924,833
DATED : Dec. 9, 1975
INVENTOR(S) : Melvin H. Korrell and Sandy C. Gay It is certified that error appears in the above-identified patent and that said Letters Patent are hereby corrected as shown below:

Page 1, column 1, line 8, after "[73] Assignee:", erase "Nibco Inc., Elkhart, Ind." and insert --Whirlpool Corporation, Benton Harbor, Mich.--.

Page 1, column 1, lines 19 and 20, after "Attorney, Agent, or Firm--", erase "Price, Heneveld, Huizenga & Cooper" and insert --Hill, Gross, Simpson, Van Santen, Steadman, Chiara & Simpson--.

Signed and Sealed this second Day of March 1976

[SEAL]

Attest:

RUTH C. MASON
*Attesting Officer*

C. MARSHALL DANN
*Commissioner of Patents and Trademarks*